US012626374B1

(12) United States Patent
Lee et al.

(10) Patent No.: US 12,626,374 B1
(45) Date of Patent: May 12, 2026

(54) METHOD FOR TRACKING MULTIPLE OBJECTS BY USING MULTIPLE CAMERAS BASED ON TEMPORAL-SPATIAL GRAPH NEURAL NETWORK UTILIZING GEOMETRIC FEATURES FOR EACH OF THE MULTIPLE OBJECTS AND OBJECT TRACKING DEVICE USING THE SAME

(71) Applicant: SUPERB AI CO., LTD., Seoul (KR)

(72) Inventors: Jungkwon Lee, Seoul (KR); Eun Soo Im, Suwon-si (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 19/388,767

(22) Filed: Nov. 13, 2025

(30) Foreign Application Priority Data

Sep. 24, 2025 (KR) ........................ 10-2025-0137897

(51) Int. Cl.
| | |
|---|---|
| *G06T 7/292* | (2017.01) |
| *G06T 7/13* | (2017.01) |
| *G06T 7/246* | (2017.01) |
| *G06V 10/26* | (2022.01) |
| *G06V 10/44* | (2022.01) |
| *G06V 10/74* | (2022.01) |

(Continued)

(52) U.S. Cl.
CPC ................ *G06T 7/292* (2017.01); *G06T 7/13* (2017.01); *G06T 7/248* (2017.01); *G06V 10/26* (2022.01);

(Continued)

(58) Field of Classification Search
CPC ........... G06T 7/292; G06T 7/13; G06T 7/248; G06T 2207/10024; G06T 2207/20072;

(Continued)

(56) References Cited

U.S. PATENT DOCUMENTS

| | | | |
|---|---|---|---|
| 11,941,820 B1 * | 3/2024 | Kim | G06T 7/207 |
| 2024/0420449 A1 * | 12/2024 | Kocamaz | G06V 10/761 |

(Continued)

FOREIGN PATENT DOCUMENTS

| | | | |
|---|---|---|---|
| CN | 118297984 A * | 7/2024 | G06N 3/0442 |
| CN | 120374672 A * | 7/2025 | G06N 3/042 |

(Continued)

OTHER PUBLICATIONS

Elena Luna, Juan Carlos San Miguel, José María Martínez, Marcos Escudero-Viñolo, "Graph Convolutional Network for Multi-Target Multi-Camera Vehicle Tracking," arXiv:2211.15538 [cs.CV], https://doi.org/10.48550/arXiv.2211.15538 (Year: 2022).*

(Continued)

*Primary Examiner* — Henok Shiferaw
*Assistant Examiner* — Woo C Rhim
(74) *Attorney, Agent, or Firm* — Maschoff Brennan

(57) ABSTRACT

There is provided a method for tracking multiple objects by using multiple cameras based on a temporal-spatial GNN utilizing geometric features for each of the multiple objects, including steps of: (a) acquiring, by an object tracking device, each of a (1_t_1)-th object descriptor to an (n_t_j)-th object descriptor; (b) calculating similarities of each of object descriptor pairs, and inputting a (1_t_1)-th node to an (n_t_j)-th node and spatial edges into the GNN, to thereby instruct the GNN to merge nodes corresponding to a same object, and thus generate a t-th spatial graph; and (c) generating correspondence information, and inputting the (t_1)-th node to the (t_k)-th node, the ((t−1)_1)-th node to the ((t−1)_p)-th node, and temporal edges into the GNN, to thereby instruct the GNN to merge nodes corresponding to the same object, and thus generate a t-th temporal-spatial graph, and finally, track the multiple objects within the specific space.

20 Claims, 6 Drawing Sheets

(51) Int. Cl.

| | |
|---|---|
| *G06V 10/762* | (2022.01) |
| *G06V 10/82* | (2022.01) |
| *G06V 10/86* | (2022.01) |
| *G06V 40/10* | (2022.01) |
| *H04N 23/90* | (2023.01) |

(52) U.S. Cl.
CPC ............ *G06V 10/44* (2022.01); *G06V 10/761* (2022.01); *G06V 10/762* (2022.01); *G06V 10/82* (2022.01); *G06V 10/86* (2022.01); *G06T 2207/10024* (2013.01); *G06T 2207/20072* (2013.01); *G06T 2207/20084* (2013.01); *G06T 2207/20132* (2013.01); *G06T 2207/30201* (2013.01); *G06T 2207/30232* (2013.01); *G06V 40/10* (2022.01); *H04N 23/90* (2023.01)

(58) Field of Classification Search
CPC . G06T 2207/20084; G06T 2207/20132; G06T 2207/30201; G06T 2207/30232; G06V 10/26; G06V 10/44; G06V 10/761; G06V 10/762; G06V 10/82; G06V 10/86; G06V 40/10; H04N 23/90
See application file for complete search history.

(56) References Cited

U.S. PATENT DOCUMENTS

| | | | | |
|---|---|---|---|---|
| 2025/0086811 A1* | 3/2025 | Meftah | .................... | G06T 7/292 |
| 2025/0232457 A1* | 7/2025 | Fujimura | ................ | G06T 7/292 |
| 2025/0299485 A1* | 9/2025 | Cetintas | .............. | G06V 10/776 |

FOREIGN PATENT DOCUMENTS

| | | | | | |
|---|---|---|---|---|---|
| JP | 6095018 A | | 3/2017 | | |
| KR | 102226372 B1 | * | 3/2021 | .......... | G01S 17/894 |
| KR | 10-2021-0141668 A | | 11/2021 | | |
| KR | 20240030368 A | * | 3/2024 | ............ | G06V 20/52 |
| KR | 1020240030368 A | | 3/2024 | | |

OTHER PUBLICATIONS

E. Luna, J. C. SanMiguel, J. M. MartÃnez and P. Carballeira, "Graph Neural Networks for Cross-Camera Data Association," in IEEE Transactions on Circuits and Systems for Video Technology, vol. 33, No. 2, pp. 589-601, Feb. 2023, doi: 10.1109/TCSVT.2022.3207223. (Year: 2023).*

Y. Wang, K. Kitani and X. Weng, "Joint Object Detection and Multi-Object Tracking with Graph Neural Networks," 2021 IEEE International Conference on Robotics and Automation (ICRA), Xi'an, China, 2021, pp. 13708-13715, doi: 10.1109/ICRA48506.2021.9561110. (Year: 2021).*

KR Office Action dated Dec. 4, 2025 in application No. 10-2025-0137897.

Cheng-Che Cheng et al., "ReST: A Reconfigurable Spatial-Temporal Graph Model for Multi-Camera Multi-Object Tracking", arXiv:2308.13229v1, Aug. 25, 2023.

Yizhou Wang et al., "MCBLT: Multi-Camera Multi-Object 3D Tracking in Long Videos", arXiv:2412.00692v3, Mar. 26, 2025.

* cited by examiner

FIG. 2

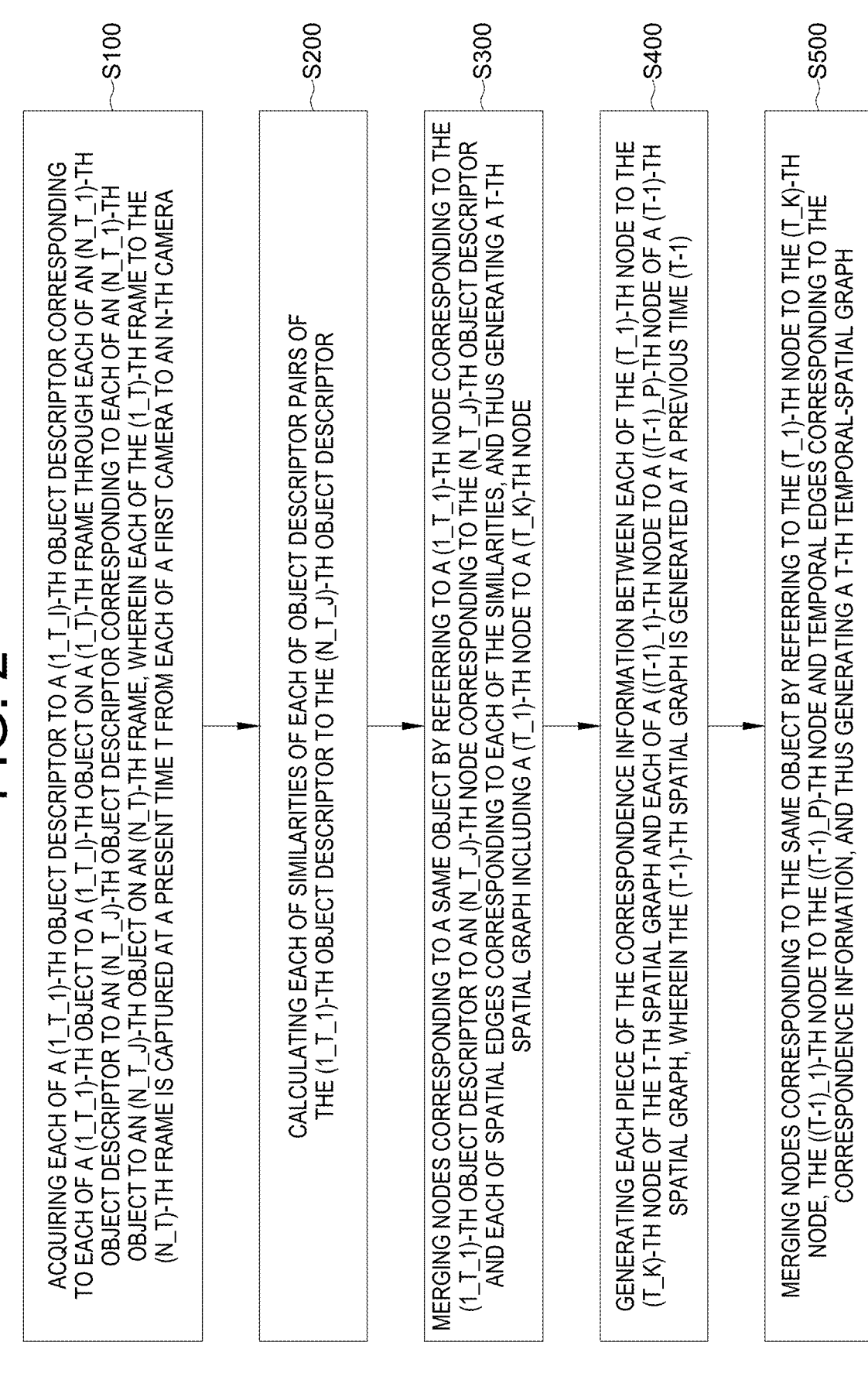

S100

ACQUIRING EACH OF A (1_T_1)-TH OBJECT DESCRIPTOR TO A (1_T_I)-TH OBJECT DESCRIPTOR CORRESPONDING TO EACH OF A (1_T_1)-TH OBJECT TO A (1_T_I)-TH OBJECT ON A (1_T)-TH FRAME THROUGH EACH OF AN (N_T_1)-TH OBJECT DESCRIPTOR TO AN (N_T_J)-TH OBJECT DESCRIPTOR CORRESPONDING TO EACH OF AN (N_T_1)-TH OBJECT TO AN (N_T_J)-TH OBJECT ON AN (N_T)-TH FRAME, WHEREIN EACH OF THE (1_T)-TH FRAME TO THE (N_T)-TH FRAME IS CAPTURED AT A PRESENT TIME T FROM EACH OF A FIRST CAMERA TO AN N-TH CAMERA

S200

CALCULATING EACH OF SIMILARITIES OF EACH OF OBJECT DESCRIPTOR PAIRS OF THE (1_T_1)-TH OBJECT DESCRIPTOR TO THE (N_T_J)-TH OBJECT DESCRIPTOR

S300

MERGING NODES CORRESPONDING TO A SAME OBJECT BY REFERRING TO A (1_T_1)-TH NODE CORRESPONDING TO THE (1_T_1)-TH OBJECT DESCRIPTOR TO AN (N_T_J)-TH NODE CORRESPONDING TO THE (N_T_J)-TH OBJECT DESCRIPTOR AND EACH OF SPATIAL EDGES CORRESPONDING TO EACH OF THE SIMILARITIES, AND THUS GENERATING A T-TH SPATIAL GRAPH INCLUDING A (T_1)-TH NODE TO A (T_K)-TH NODE

S400

GENERATING EACH PIECE OF THE CORRESPONDENCE INFORMATION BETWEEN EACH OF THE (T_1)-TH NODE TO THE (T_K)-TH NODE OF THE T-TH SPATIAL GRAPH AND EACH OF A ((T-1)_1)-TH NODE TO A ((T-1)_P)-TH NODE OF A (T-1)-TH SPATIAL GRAPH, WHEREIN THE (T-1)-TH SPATIAL GRAPH IS GENERATED AT A PREVIOUS TIME (T-1)

S500

MERGING NODES CORRESPONDING TO THE SAME OBJECT BY REFERRING TO THE (T_1)-TH NODE TO THE (T_K)-TH NODE, THE ((T-1)_1)-TH NODE TO THE ((T-1)_P)-TH NODE AND TEMPORAL EDGES CORRESPONDING TO THE CORRESPONDENCE INFORMATION, AND THUS GENERATING A T-TH TEMPORAL-SPATIAL GRAPH

T_2

T_1

T_5

T_3

T_4

TIME T     TIME (T-1)     TIME (T-2)     TIME (T-3)

METHOD FOR TRACKING MULTIPLE OBJECTS BY USING MULTIPLE CAMERAS BASED ON TEMPORAL-SPATIAL GRAPH NEURAL NETWORK UTILIZING GEOMETRIC FEATURES FOR EACH OF THE MULTIPLE OBJECTS AND OBJECT TRACKING DEVICE USING THE SAME

CROSS REFERENCE TO RELATED APPLICATION

This application claims the benefit of priority to Korean Patent Application No. 10-2025-0137897, filed on Sep. 24, 2025, the entire contents of which being incorporated herein by reference.

FIELD OF THE DISCLOSURE

The present disclosure relates to a Multi-Target Multi-Camera (MTMC) tracking, and more specifically, a method for tracking multiple objects by using multiple cameras based on a temporal-spatial GNN utilizing geometric features for each of the multiple objects and an object tracking device using the same.

BACKGROUND OF THE DISCLOSURE

A security system utilizing cameras, such as CCTV, is commonly used to ensure a security of a specific space. These cameras are installed in large buildings such as hypermarkets, department stores, research centers, and public institutions, or in smaller buildings such as homes, daycare centers, convenience stores, and banks, as well as in public spaces such as parks and roads. Images captured by the cameras are used to conduct real-time surveillance or analyze information about the corresponding space.

In order to ensure the security of the specific space through the images captured by the cameras, multiple objects such as people and cars must be tracked, and MOT (Multiple Object Tracking) technology has been used to detect each of locations of each of the multiple objects within a single camera or a single sequence for each of frames and consistently link each of unique IDs of each of the multiple objects between the frames.

Furthermore, there is an MTMC (Multi-Target Multi-Camera) tracking method, which extends the MOT with multiple cameras and continuously synchronizes object IDs among the multiple cameras, wherein each of the multiple cameras has different locations and different viewing frustums.

This type of object tracking re-identifies a same object observed from different viewpoints or different cameras, and thus, the tracking is conducted by following a trajectory of the object.

Also, a filter-based technique and an AI-based technique are primarily used to re-identify the object, i.e., to associate data.

The filter-based technique estimates a state of the object by repeating an observation and a prediction, and perform a data association while correcting the state of the object to maintain a continuity between the frames by using a dynamic model, such as a Kalman filter, an extended Kalman filter, and an unscented Kalman filter, or perform the data association while correcting the state of the object to maintain the continuity between the frames by using a probabilistic hypothesis on a distribution of a measurement noise, such as the JPDA (Joint Probability Data Association) and MHT (Multiple Hypothesis Tracking).

In addition, the AI-based technique directly performs or assists the data association by allowing a network to train an object feature embedding and a spatiotemporal relationship. In particular, a tracking-by-attention method, which utilizes a transformer architecture and an attention mechanism, treats each piece of appearance/location information of each of the objects as tokens and automatically determines a matching of the object IDs by training inter-frame interactions.

However, since many elements of a conventional MTMC/MOT-based tracking model that make up an algorithm, such as a feature extraction, an association rule, and a distance threshold, are manually designed, it is difficult to apply the tracking model optimized for a specific capturing environment to another capturing environment after it has been optimized for the specific capturing environment, such as a camera placement, lighting, and a crowd density. In addition, the tracking model designed based on rules takes a lot of time for a parameter adjustment, and it is difficult to sufficiently reflect complex interactions such as an object occlusion, an object reappearance, and an object movement between asynchronous cameras. Accordingly, there are limitations in a performance of the tracking model and its applicability to real-world situations.

Furthermore, as the performance of the tracking model depends on training data, recently emerging AI-based tracking model suffers from a significant performance degradation when applied to commercial applications due to insufficient training data. In particular, the MTMC presents numerous variables, such as differences in field of view between the cameras, time deviations, various movement paths and reappearances. This makes it difficult for the tracking models trained in a single domain to accurately re-identify the objects when expanded to different spaces, seasons or event conditions.

SUMMARY OF THE DISCLOSURE

It is an object of the present disclosure to solve all the aforementioned problems.

It is another object of the present disclosure to enable an accurate object tracking regardless of a capturing environment of a camera.

It is still another object of the present disclosure to enable a more accurate object re-identification by utilizing geometric features for each of multiple objects.

It is still yet another object of the present disclosure to provide an object tracking device applicable to various real-world situations without requiring separate design modifications.

It is still yet another object of the present disclosure to enable the object tracking by using minimal computing resources.

In accordance with one aspect of the present disclosure, there is provided a method for tracking multiple objects by using multiple cameras based on a temporal-spatial GNN utilizing geometric features for each of the multiple objects, comprising steps of: (a) acquiring, by an object tracking device, each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; (b) calculating, by the object tracking device, similarities of each of object descriptor pairs by referring to the (1_t_1)-th object descriptor to the (n_t_j)-th object descriptor, wherein each of the object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and inputting, by the object tracking device, a (1_t_1)-th node corresponding to the (1_t_1)-th object descriptor to an (n_t_j)-th node corresponding to the (n_t_j)-th object descriptor and each of spatial edges corresponding to each of the similarities into the GNN (Graph Neural Network), to thereby instruct the GNN to (i) merge nodes corresponding to a same object among the (1_t_1)-th node to the (n_t_j)-th node by referring to the (1_t_1)-th node to the (n_t_j)-th node and the spatial edges, and thus (ii) generate a t-th spatial graph including a (t_1)-th node to a (t_k)-th node, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist; and (c) generating, by the object tracking device, each piece of correspondence information between each of the (t_1)-th node to the (t_k)-th node of the t-th spatial graph and each of a ((t−1)_1)-th node to a ((t−1)_p)-th node of a (t−1)-th spatial graph, wherein the (t−1)-th spatial graph is generated at a previous time (t−1), and wherein if an object detected within the specific space in the previous time (t−1) exists, the p is 1 or more, otherwise, the ((t−1)_1)-th node to the ((t−1)_p)-th node do not exist, and inputting, by the object tracking device, the (t_1)-th node to the (t_k)-th node, the ((t−1)_1)-th node to the ((t−1)_p)-th node, and temporal edges corresponding to each piece of the correspondence information into the GNN, to thereby instruct the GNN to (i) merge nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate a t-th temporal-spatial graph, and finally, (ii) track the multiple objects within the specific space.

As one example, at the step of (a), a specific object descriptor, which is one of the (1_t_1)-th object descriptor to the (n_t_j)-th object descriptor, includes specific appearance feature information and specific geometric feature information, wherein the specific appearance feature information has embedded features which are acquired by embedding at least one of (i) a cropped image or its feature information, wherein the cropped image is obtained by cropping a specific object area corresponding to a specific object from a specific frame, wherein the specific frame is captured by a specific camera corresponding to the specific object descriptor, wherein the specific camera is one of the first camera to the n-th camera, (ii) clothing color information of the specific object, (iii) hairstyle information of the specific object, (iv) hair color information of the specific object, (v) skin color information of the specific object, and (vi) facial feature information of the specific object, wherein the specific geometric feature information has at least one of (i) BEV (Bird's Eye View) coordinate information obtained by projecting a center coordinate of a bounding box corresponding to the specific object onto a ground plane based on camera parameters of the specific camera, (ii) object displacement information, which is a displacement of the specific object estimated by referring to the BEV coordinate, (iii) 3D epipolar similarity information for the specific object calculated based on the specific camera and at least one other camera, wherein the at least one other camera has another viewing frustum that at least partially overlaps with a specific viewing frustum of the specific camera, (iv) object key point information according to a pose of the specific object, and (v) body shape information of the specific object.

As one example, the specific appearance feature information further includes reliability information indicating a reliability of the embedded features due to an occlusion of the specific object between the specific frame and other frames.

As one example, at the step of (c), in generating specific correspondence information between a (t_specific)-th node and a ((t−1)_specific)-th node, wherein the (t_specific)-th node is one of the (t_1)-th node to the (t_k)-th node and the ((t−1)_specific)-th node is one of the ((t−1)_1)-th node to ((t−1)¬_p)-th node, the object tracking device generates the specific correspondence information such that the specific correspondence information includes at least one of (i) time interval information between the present time t and the previous time (t−1), (ii) movement distance information between the (t_specific)-th node and the ((t−1)_specific)-th node within the specific space, and (iii) velocity difference information between the (t_specific)-th node and the ((t−1)_specific)-th node.

As one example, at the step of (a), the object tracking device receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

As one example, at the step of (a), a specific edge device, which is one of the first edge device to the n-th edge device, performs an object detection on a specific frame, which is captured by a specific camera corresponding to the specific edge device, to thereby detect specific objects on the specific frame, wherein the specific camera is one of the first camera to the n-th camera, generates each piece of specific appearance feature information of each of the specific objects by referring to each of detection results of each of the specific objects, generates each piece of specific geometric feature information for each of the specific objects based on at least the specific camera, and generates each of specific object descriptors for each of the specific objects by referring to each piece of the specific appearance feature information and each piece of the specific geometric feature information.

As one example, at the step of (a), the object tracking device receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

In accordance with another aspect of the present disclosure, there is provided a method for tracking multiple objects by using multiple cameras based on a temporal-spatial GNN utilizing geometric features for each of the multiple objects, comprising steps of: (a) acquiring, by an object tracking device, each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; and (b) generating, by the object tracking device, similarities of each of spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of a ((t−1)_1)-th node to a ((t−1)_p)-th node, wherein each of the ((t−1)_1)-th node to the ((t−1)_p)-th node is a node of a (t−1)-th temporal-spatial graph generated at a previous time (t−1), wherein each of the spatial object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and wherein if an object detected within the specific space in the previous times exists, the p is 1 or more, otherwise, the ((t−1)_1)-th node to the ((t−1)_p)-th node do not exist, and inputting, by the object tracking device, a (1_t_1)-th node corresponding to the (1_t_1)-th object descriptor to an (n_t_j)-th node corresponding to the (n_t_j)-th object descriptor, the ((t−1)_1)-th node to the ((t−1)_p)-th node, spatial edges corresponding to the similarities, and temporal edges corresponding to the correspondence information into the GNN (Graph Neural Network), to thereby instruct the GNN to (i) perform one of sub-processes of: (i-1) merging nodes corresponding to a same object among the (1_t_1)-th node to the (n_t_j)-th node by referring to the spatial edges, and thus generating a (t_1)-th node to a (t_k)-th node, merging nodes corresponding to the same object among the (t_1)-th node to the (t_k)-th node and the ((t−1)_1)-th node to the ((t−1)_p)-th node by referring to the temporal edges, and thus generating a t-th temporal-spatial graph; and (i-2) merging nodes corresponding to the same object among the (1_t_1)-th node to the (n_t_j)-th node and the ((t−1)_1)-th node to the ((t−1)_p)-th node by referring to the temporal edges, identifying merged nodes and unmerged nodes among the (1_t_1)-th node to the (n_t_j)-th node, merging nodes corresponding to the same object among the merged nodes and the unmerged nodes, and thus generating the t-th temporal-spatial graph; and finally, (ii) track the multiple objects within the specific space, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist.

As one example, at the step of (a), the object tracking device receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

As one example, at the step of (a), the object tracking device receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

In accordance with another aspect of the present disclosure there is provided an object tracking device for tracking multiple objects by using multiple cameras based on a temporal-spatial GNN utilizing geometric features for each of the multiple objects, comprising: at least one memory which saves instructions for tracking the multiple objects by using the multiple cameras based on the temporal-spatial GNN utilizing the geometric features for each of the multiple objects; and at least one processor configured to perform an operation for tracking the multiple objects by using the multiple cameras based on the temporal-spatial GNN utilizing the geometric features for each of the multiple objects according to the instructions stored in the memory to perform processes of: (I) acquiring each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; (II) calculating similarities of each of object descriptor pairs by referring to the (1_t_1)-th object descriptor to the (n_t_j)-th object descriptor, wherein each of the object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and inputting a (1_t_1)-th node corresponding to the (1_t_1)-th object descriptor to an (n_t_j)-th node corresponding to the (n_t_j)-th object descriptor and each of spatial edges corresponding to each of the similarities into the GNN (Graph Neural Network), to thereby instruct the GNN to (i) merge nodes corresponding to a same object among the (1_t_1)-th node to the (n_t_j)-th node by referring to the (1_t_1)-th node to the (n_t_j)-th node and the spatial edges, and thus (ii) generate a t-th spatial graph including a (t_1)-th node to a (t_k)-th node, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist; and (III) generating each piece of correspondence information between each of the (t_1)-th node to the (t_k)-th node of the t-th spatial graph and each of a ((t−1)_1)-th node to a ((t−1)_p)-th node of a (t−1)-th spatial graph, wherein the (t−1)-th spatial graph is generated at a previous time (t−1), and wherein if an object detected within the specific space in the previous time (t−1) exists, the p is 1 or more, otherwise, the ((t−1)_1)-th node to the ((t−1)_p)-th node do not exist, and inputting the (t_1)-th node to the (t_k)-th node, the ((t−1)_1)-th node to the ((t−1)_p)-th node, and temporal edges corresponding to each piece of the correspondence information into the GNN, to thereby instruct the GNN to (i) merge nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate a t-th temporal-spatial graph, and finally, (ii) track the multiple objects within the specific space.

As one example, a specific object descriptor, which is one of the (1_t_1)-th object descriptor to the (n_t_j)-th object descriptor, includes specific appearance feature information and specific geometric feature information, wherein the specific appearance feature information has embedded features which are acquired by embedding at least one of (i) a cropped image or its feature information, wherein the cropped image is obtained by cropping a specific object area corresponding to a specific object from a specific frame, wherein the specific frame is captured by a specific camera corresponding to the specific object descriptor, wherein the specific camera is one of the first camera to the n-th camera, (ii) clothing color information of the specific object, (iii) hairstyle information of the specific object, (iv) hair color information of the specific object, (v) skin color information of the specific object, and (vi) facial feature information of the specific object, wherein the specific geometric feature information has at least one of (i) BEV (Bird's Eye View) coordinate information obtained by projecting a center coordinate of a bounding box corresponding to the specific object onto a ground plane based on camera parameters of the specific camera, (ii) object displacement information, which is a displacement of the specific object estimated by referring to the BEV coordinate, (iii) 3D epipolar similarity information for the specific object calculated based on the specific camera and at least one other camera, wherein the at least one other camera has another viewing frustum that at least partially overlaps with a specific viewing frustum of the specific camera, (iv) object key point information according to a pose of the specific object, and (v) body shape information of the specific object.

As one example, the specific appearance feature information further includes reliability information indicating a reliability of the embedded features due to an occlusion of the specific object between the specific frame and other frames.

As one example, at the process of (III), in generating specific correspondence information between a (t_specific)-th node and a ((t−1)_specific)-th node, wherein the (t_specific)-th node is one of the (t_1)-th node to the (t_k)-th node and the ((t−1)_specific)-th node is one of the ((t−1)_1)-th node to ((t−1)¬_p)-th node, the processor generates the specific correspondence information such that the specific correspondence information includes at least one of (i) time interval information between the present time t and the previous time (t−1), (ii) movement distance information between the (t_specific)-th node and the ((t−1)_specific)-th node within the specific space, and (iii) velocity difference information between the (t_specific)-th node and the ((t−1)_specific)-th node.

As one example, at the process of (I), the processor receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

As one example, at the process of (I), a specific edge device, which is one of the first edge device to the n-th edge device, performs an object detection on a specific frame, which is captured by a specific camera corresponding to the specific edge device, to thereby detect specific objects on the specific frame, wherein the specific camera is one of the first camera to the n-th camera, generates each piece of specific appearance feature information of each of the specific objects by referring to each of detection results of each of the specific objects, generates each piece of specific geometric feature information for each of the specific objects based on at least the specific camera, and generates each of specific object descriptors for each of the specific objects by referring to each piece of the specific appearance feature information and each piece of the specific geometric feature information.

As one example, at the process of (I), the processor receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

In accordance with another aspect of the present disclosure there is provided an object tracking device for tracking multiple objects by using multiple cameras based on a temporal-spatial GNN utilizing geometric features for each of the multiple objects, comprising: at least one memory which saves instructions for tracking the multiple objects by using the multiple cameras based on the temporal-spatial GNN utilizing the geometric features for each of the multiple objects; and at least one processor configured to perform an operation for tracking the multiple objects by using the multiple cameras based on the temporal-spatial GNN utilizing the geometric features for each of the multiple objects according to the instructions stored in the memory to perform processes of: (I) acquiring each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; and (II) generating similarities of each of spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of a ((t−1)_1)-th node to a ((t−1)_p)-th node, wherein each of the ((t−1)_1)-th node to the ((t−1)_p)-th node is a node of a (t−1)-th temporal-spatial graph generated at a previous time (t−1), wherein each of the spatial object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and wherein if an object detected within the specific space in the previous times exists, the p is 1 or more, otherwise, the ((t−1)_1)-th node to the ((t−1)_p)-th node do not exist, and inputting a (1_t_1)-th node corresponding to the (1_t_1)-th object descriptor to an (n_t_j)-th node corresponding to the (n_t_j)-th object descriptor, the ((t−1)_1)-th node to the ((t−1)_p)-th node, spatial edges corresponding to the similarities, and temporal edges corresponding to the correspondence information into the GNN (Graph Neural Network), to thereby instruct the GNN to (i) perform one of sub-processes of: (i−1) merging nodes corresponding to a same object among the (1_t_1)-th node to the (n_t_j)-th node by referring to the spatial edges, and thus generating a (t_1)-th node to a (t_k)-th node, merging nodes corresponding to the same object among the (t_1)-th node to the (t_k)-th node and the ((t−1)_1)-th node to the ((t−1)_p)-th node by referring to the temporal edges, and thus generating a t-th temporal-spatial graph; and (i−2) merging nodes corresponding to the same object among the (1_t_1)-th node to the (n_t_j)-th node and the ((t−1)_1)-th node to the ((t−1)_p)-th node by referring to the temporal edges, identifying merged nodes and unmerged nodes among the (1_t_1)-th node to the (n_t_j)-th node, merging nodes corresponding to the same object among the merged nodes and the unmerged nodes, and thus generating the t-th temporal-spatial graph; and finally, (ii) track the multiple objects within the specific space, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist.

As one example, at the process of (I), the processor receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

As one example, at the process of (I), the processor receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 2 is a drawing schematically illustrating a method for tracking the multiple objects by using the multiple cameras in accordance with one example embodiment of the present disclosure.

DETAILED DESCRIPTION OF THE PREFERRED EMBODIMENTS

Figure 1:
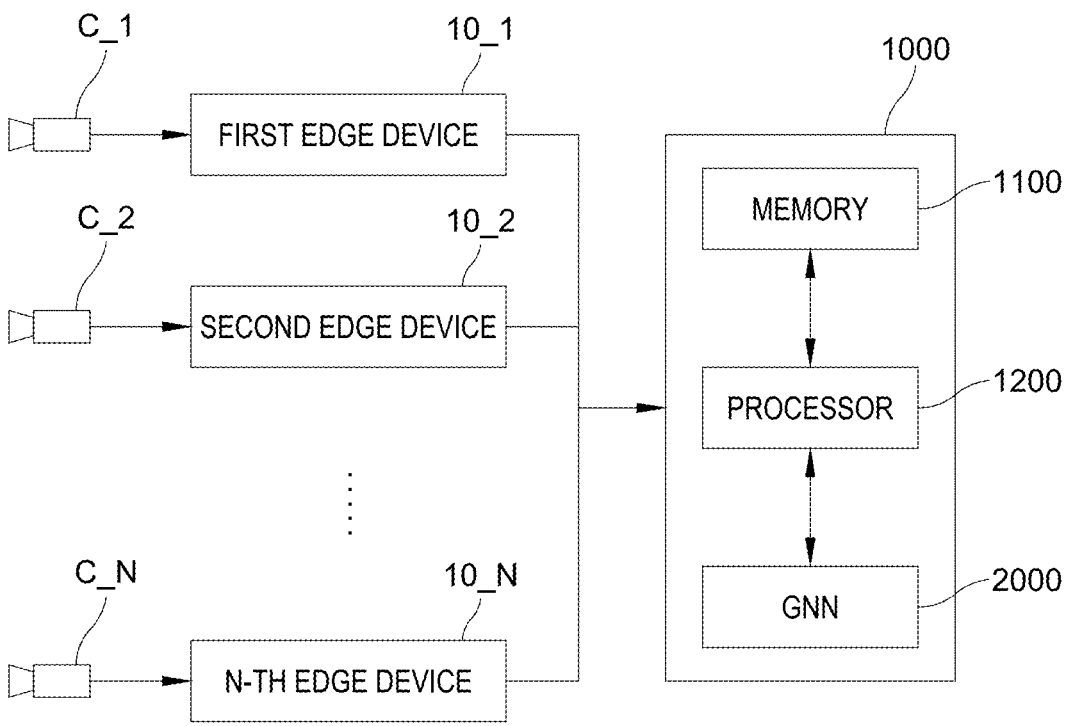
FIG. 1 is a drawing schematically illustrating an object tracking device for tracking multiple objects by using multiple cameras in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating an object tracking device for tracking multiple objects by using multiple cameras in accordance with one example embodiment of the present disclosure. By referring to FIG. 1, the object tracking device 1000 may include at least one memory 1100 which saves instructions for tracking the multiple objects by using the multiple cameras C_1 to C_n based on a temporal-spatial GNN (Graph Neural Network) 2000 utilizing geometric features for each of the multiple objects, and at least one processor 1200 configured to perform an operation for tracking the multiple objects by using the multiple cameras C_1 to C_n based on the temporal-spatial GNN (Graph Neural Network) 2000 utilizing the geometric features for each of the multiple objects according to the instructions stored in the memory 1100. Also, the object tracking device 1000 may further include the GNN 2000 for performing an object re-identification for the object tracking, but the present disclosure is not limited thereto, and the GNN 2000 may be installed in a cloud environment or another computing device.

Specifically, the object tracking device 1000 may typically achieve a desired system performance by using combinations of at least one computing device, e.g., a computer processor, a memory, a storage, an input device, an output device, or any other conventional computing components, an electronic communication device such as a router or a switch, an electronic information storage system such as a network-attached storage (NAS) and a storage area network (SAN), and at least one computer software, e.g., any instructions that allow the computing device to function in a specific way, but the present disclosure is not limited thereto.

Also, the processor 1200 of the object tracking device 1000 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the object tracking device 1000 including an integrated processor which is an integrated form of the medium, the processor, and the memory for performing the present disclosure.

Meanwhile, according to the instructions stored in the memory 1100, the processor 1200 of the object tracking device 1000 may perform a process of: acquiring each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera C_1 to an n-th camera C_n installed in a specific space, and wherein the first camera C_1 to the n-th camera C_n have different viewing frustums. Herein, if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist. Also, if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist. In addition, each piece of the appearance feature information for each of the (1_t_1)-th object to the (n_t_j)-th object may include each of the embedded features which are acquired by embedding at least one of (i) each of cropped images or its feature information, wherein each of the cropped images is obtained by cropping each of object areas corresponding to each of the (1_t_1)-th object to the (n_t_j)-th object from each of corresponding frames, (ii) each piece of clothing color information of each of the (1_t_1)-th object to the (n_t_j)-th object, (iii) each piece of hairstyle information of each of the (1_t_1)-th object to the (n_t_j)-th object, (iv) each piece of hair color information of each of the (1_t_1)-th object to the (n_t_j)-th object, (v) each piece of skin color information of each of the (1_t_1)-th object to the (n_t_j)-th object, and (vi)

each piece of facial feature information of each of the (1_t_1)-th object to the (n_t_j)-th object, but the present disclosure is not limited thereto, and various information representing the appearance features of the objects may be used as the appearance feature information. Furthermore, each piece of the geometric feature information for each of the (1_t_1)-th object to the (n_t_j)-th object may include at least one of (i) each piece of BEV (Bird's Eye View) coordinate information obtained by projecting each of center coordinates of each of bounding boxes corresponding to each of the (1_t_1)-th object to the (n_t_j)-th object onto a ground plane based on each of camera parameters of each of the cameras, (ii) each piece of object displacement information, which is a displacement of each of the (1_t_1)-th object to the (n_t_j)-th object estimated by referring to each of the BEV coordinates, (iii) each piece of 3D epipolar similarity information for each of the (1_t_1)-th object to the (n_t_j)-th object calculated based on each of the cameras and at least one other camera, wherein the at least one other camera has another viewing frustum that at least partially overlaps with each of viewing frustums of each of the cameras, (iv) each piece of object key point information according to each of poses of each of the (1_t_1)-th object to the (n_t_j)-th object, and (v) each piece of body shape information identifying each of body proportions of each of the (1_t_1)-th object to the (n_t_j)-th object, but the present disclosure is not limited thereto, and various geometric information related to the objects within the specific space may be included. In addition, each piece of the appearance feature information of each of the (1_t_1)-th object to the (n_t_j)-th object may further include each piece of reliability information indicating a reliability of each of the embedded features due to an occlusion of the object between the frames. Next, according to the instructions stored in the memory 1100, the processor 1200 of the object tracking device 1000 may perform processes of: calculating similarities of each of object descriptor pairs by referring to the (1_t_1)-th object descriptor to the (n_t_j)-th object descriptor, and inputting a (1_t_1)-th node corresponding to the (1_t_1)-th object descriptor to an (n_t_j)-th node corresponding to the (n_t_j)-th object descriptor and each of spatial edges corresponding to each of the similarities into the GNN 2000, to thereby instruct the GNN 2000 to (i) merge nodes corresponding to a same object among the (1_t_1)-th node to the (n_t_j)-th node by referring to the (1_t_1)-th node to the (n_t_j)-th node and the spatial edges, and thus (ii) generate a t-th spatial graph including a (t_1)-th node to a (t_k)-th node. Herein, each of the object descriptor pairs may be each of pairs having one object descriptor among the (1_t_1)-th object descriptor to the (n_t_j)-th object descriptor and another object descriptor among the (1_t_1)-th object descriptor to the (n_t_j)-th object descriptor. In addition, if the (1_t_1)-th node to the (n_t_j)-th node exist, the k is 1 or more, and if the (1_t_1)-th node to the (n_t_j)-th node do not exist, the (t_1)-th node to the (t_k)-th node may not exist. Next, according to the instructions stored in the memory 1100, the processor 1200 of the object tracking device 1000 may perform processes of: generating each piece of correspondence information between each of the (t_1)-th node to the (t_k)-th node of the t-th spatial graph and each of a ((t−1)_1)-th node to a ((t−1)_p)-th node of a (t−1)-th spatial graph, wherein the (t−1)-th spatial graph is generated at a previous time (t−1), and inputting the (t_1)-th node to the (t_k)-th node, the ((t−1)_1)-th node to the ((t−1)_p)-th node, and temporal edges corresponding to each piece of the correspondence information into the GNN 2000, to thereby instruct the GNN 2000 to (i) merge nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate a t-th temporal-spatial graph, and finally, (ii) track the multiple objects within the specific space. Herein, if an object detected within the specific space in the previous time (t−1) exists, the p is 1 or more, otherwise, the ((t−1)_1)-th node to the ((t−1)_p)-th node may not exist.

In contrast, according to the instructions stored in the memory 1100, the processor 1200 of the object tracking device 1000 may perform a process of: acquiring each of the (1_t_1)-th object descriptor to the (1_t_i)-th object descriptor corresponding to each of the (1_t_1)-th object to the (1_t_i)-th object on the (1_t)-th frame through each of the (n_t_1)-th object descriptor to the (n_t_j)-th object descriptor corresponding to each of the (n_t_1)-th object to the (n_t_j)-th object on the (n_t)-th frame, wherein each of (1_t)-th frame to the (n_t)-th frame is captured at the present time t from each of the first camera to the n-th camera installed in the specific space. Next, according to the instructions stored in the memory 1100, the processor 1200 of the object tracking device 1000 may perform processes of: generating similarities of each of spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of the ((t−1)_1)-th node to the ((t−1)_p)-th node, wherein each of the ((t−1)_1)-th node to the ((t−1)_p)-th node is a node of a (t−1)-th temporal-spatial graph generated at the previous time (t−1), and inputting the (1_t_1)-th node corresponding to the (1_t_1)-th object descriptor to the (n_t_j)-th node corresponding to the (n_t_j)-th object descriptor, the ((t−1)_1)-th node to the ((t−1)_p)-th node, the spatial edges corresponding to the similarities, and the temporal edges corresponding to the correspondence information into the GNN 2000, to thereby instruct the GNN 2000 to (i) perform one of sub-processes of: (i−1) merging nodes corresponding to the same object among the (1_t_1)-th node to the (n_t_j)-th node by referring to the spatial edges, and thus generating the (t_1)-th node to the (t_k)-th node, merging nodes corresponding to the same object among the (t_1)-th node to the (t_k)-th node and the ((t−1)_1)-th node to the ((t−1)_p)-th node by referring to the temporal edges, and thus generating the t-th temporal-spatial graph; and (i−2) merging nodes corresponding to the same object among the (1_t_1)-th node to the (n_t_j)-th node and the ((t−1)_1)-th node to the ((t−1)_p)-th node by referring to the temporal edges, identifying merged nodes and unmerged nodes among the (1_t_1)-th node to the (n_t_j)-th node, merging nodes corresponding to the same object among the merged nodes and the unmerged nodes, and thus generating the t-th temporal-spatial graph; and finally, (ii) track the multiple objects within the specific space.

The method for tracking the multiple objects by using the multiple cameras based on the temporal-spatial GNN utilizing the geometric features for each of the multiple objects in the object tracking device 1000 configured as above will be described in more detail by referring to FIG. 1 and FIG. 2.

First, the object tracking device 1000 may acquire each of the (1_t_1)-th object descriptor to the (1_t_i)-th object descriptor corresponding to each of the (1_t_1)-th object to the (1_t_i)-th object on the (1_t)-th frame through each of the (n_t_1)-th object descriptor to the (n_t_j)-th object descriptor corresponding to each of the (n_t_1)-th object to the $(n\_t\_j)$-th object on the $(n\_t)$-th frame at a step of S100, wherein each of the $(1\_t)$-th frame to the $(n\_t)$-th frame is captured at the present time t from each of the first camera $C\_1$ to the n-th camera $C\_n$ installed in the specific space, and wherein the first camera $C\_1$ to the n-th camera $C\_n$ are the multiple cameras having different viewing frustums.

Herein, if the object exists on the $(1\_t)$-th frame, the i is 1 or more, and each of the $(1\_t\_1)$-th object descriptor to the $(1\_t\_i)$-th object descriptor includes respective appearance feature information and respective geometric feature information for each of the $(1\_t\_1)$-th object to the $(1\_t\_i)$-th object, and if the object does not exist on the $(1\_t)$-th frame, the $(1\_t\_1)$-th object descriptor to the $(1\_t\_i)$-th object descriptor may not exist. Also, if the object exists on the $(n\_t)$-th frame, the j is 1 or more, and each of the $(n\_t\_1)$-th object descriptor to the $(n\_t\_j)$-th object descriptor includes respective appearance feature information and respective geometric feature information for each of the $(n\_t\_1)$-th object to the $(n\_t\_j)$-th object, and if the object does not exist on the $(n\_t)$-th frame, the $(n\_t\_1)$-th object descriptor to the $(n\_t\_j)$-th object descriptor may not exist.

Meanwhile, a process of generating the $(1\_t\_1)$-th object descriptor to the $(n\_t\_j)$-th object descriptor is described in more detail as follows.

Each of the $(1\_t)$-th frame to the $(n\_t)$-th frame, which is an image captured at the present time t from each of the first camera $C\_1$ to the n-th camera $C\_n$ installed in the specific space, may be transmitted to each of a first edge device $10\_1$ to an n-th edge device $10\_n$ corresponding to each of the first camera $C\_1$ to the n-th camera $C\_n$. Herein, each of the first edge device $10\_1$ to the n-th edge device $10\_n$ may be a computing device located at an edge of an entire system that performs a surveillance, a security, etc. for the specific space, including the object tracking device $1000$, and may be installed in a modular manner in each of the corresponding first camera $C\_1$ to the n-th camera $C\_n$, or may be installed spaced apart from each of the corresponding first camera $C\_1$ to the n-th camera $C\_n$ so as to be able to receive the images captured by each of the first camera $C\_1$ to the n-th camera $C\_n$. However, unlike the first edge device $10\_1$ to the n-th edge device $10\_n$ corresponding to each of the first camera $C\_1$ to the n-th camera $C\_n$ being installed, a first edge device to an n'-th edge device corresponding to first grouped cameras to n'th grouped cameras may be installed, wherein the first grouped cameras to the n'-th grouped cameras are acquired by clustering the first camera $C\_1$ to the n-th camera $C\_n$ into one or more groups. Herein, it may not be excluded that some of the grouped cameras include only one camera.

In addition, each of the first edge device $10\_1$ to the n-th edge device $10\_n$ that receives each of the $(1\_t)$-th frame to the $(n\_t)$-th frame may perform an object detection on each of a first frame to an n-th frame, thereby detecting each of the $(1\_t\_1)$-th object to the $(1\_t\_i)$-th object on the first frame through the $(n\_t\_1)$-th object to the $(n\_t\_j)$-th object on the n-th frame.

Next, each of the first edge device $10\_1$ to the n-th edge device $10\_n$ may generate each piece of appearance feature information of each of the $(1\_t\_1)$-th object to the $(n\_t\_j)$-th object by referring to each of detection results of each of the $(1\_t\_1)$-th object to the $(1\_t\_i)$-th object on the first frame through each of the $(n\_t\_1)$-th object to the $(n\_t\_j)$-th object on the n-th frame, generate each piece of geometric feature information for each of the $(1\_t\_1)$-th object to the $(n\_t\_j)$-th object based on each of the cameras, and generate each of the $(1\_t\_1)$-th object descriptor corresponding to the $(1\_t\_1)$-th object to the $(n\_t\_j)$-th object descriptor corresponding to the $(n\_t\_j)$-th object by referring to each piece of the appearance feature information and each piece of the geometric feature information.

That is, a specific edge device, which is one of the first edge device $10\_1$ to the n-th edge device $10\_n$, may perform the object detection on a specific frame, which is captured by a specific camera corresponding to the specific edge device, to thereby detect specific objects on the specific frame, wherein the specific camera is one of the first camera $C\_1$ to the n-th camera $C\_n$, generate each piece of specific appearance feature information of each of the specific objects by referring to each of detection results of each of the specific objects, generate each piece of specific geometric feature information for each of the specific objects based on at least the specific camera, and generate each of specific object descriptors for each of the specific objects by referring to each piece of the specific appearance feature information and each piece of the specific geometric feature information.

Herein, the specific object descriptor, which is one of the $(1\_t\_1)$-th object descriptor to the $(n\_t\_j)$-th object descriptor, may include the specific appearance feature information and the specific geometric feature information. Also, the specific appearance feature information may have embedded features which are acquired by embedding at least one of (i) a cropped image or its feature information, wherein the cropped image is obtained by cropping a specific object area corresponding to the specific object from the specific frame, wherein the specific frame is captured by the specific camera corresponding to the specific object descriptor, and wherein the specific camera is one of the first camera $C\_1$ to the n-th camera $C\_n$, (ii) clothing color information of the specific object, (iii) hairstyle information of the specific object, (iv) hair color information of the specific object, (v) skin color information of the specific object, and (vi) facial feature information of the specific object, but the present disclosure is not limited thereto, and various information representing the appearance features of the specific object may be used as the specific appearance feature information. Furthermore, the specific geometric feature information may have at least one of (i) BEV (Bird's Eye View) coordinate information obtained by projecting a center coordinate of a bounding box corresponding to the specific object onto the ground plane based on camera parameters of the specific camera, (ii) object displacement information, which is a displacement of the specific object estimated by referring to the BEV coordinate, (iii) 3D epipolar similarity information for the specific object calculated based on the specific camera and at least one other camera, wherein the at least one other camera has another viewing frustum that at least partially overlaps with a specific viewing frustum of the specific camera, (iv) object key point information according to a pose of the specific object, and (v) body shape information of the specific object, but the present disclosure is not limited thereto, and various geometric information related to the specific object within the specific space may be used as the specific geometric feature information. Also, the specific appearance feature information may further include reliability information indicating a reliability of the embedded features due to an occlusion of the specific object between the specific frame and other frames, and accordingly, a re-identification performance for the objects detected from the different cameras may be improved.

For example, a process of generating an object descriptor is exemplarily described by referring to FIG. 3 as follows.

Figure 3:
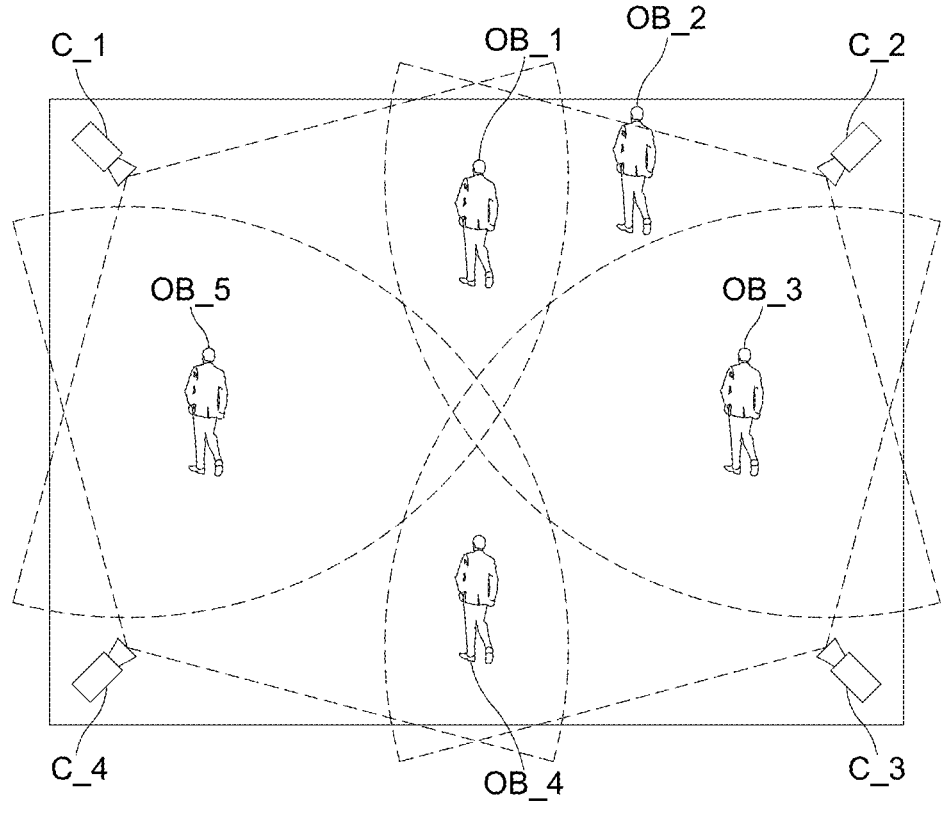
FIG. 3 is a drawing schematically illustrating a state of capturing a specific space by using the multiple cameras in the method for tracking the multiple objects by using the multiple cameras in accordance with one example embodiment of the present disclosure.

FIG. 3 exemplarily illustrates a state where four cameras $C\_1$ to $C\_4$ are installed so that their viewing frustums overlap each other within the specific space, and five objects OB_1 to OB_5 are located within the specific space. However, the present disclosure is not limited thereto, and some cameras may be installed so that their viewing frustums do not overlap, and in the specific space, such as a building with two floors, at least one camera may be installed on each floor. In addition, the edge devices may be installed so as to correspond to each of the cameras, or may be installed so as to correspond to each of the grouped cameras. In the following description, the four cameras C_1 to C_4 are described as the first camera C_1 to a fourth camera C_4, the edge devices corresponding to each of the first camera C_1 to the fourth camera C_4 are described as the first edge device to a fourth edge device, and five objects OB_1 to OB_5 are described as the first object OB_1 to a fifth object OB_5.

In this state, at the present time t, the (1_t)-th frame captured by the first camera C_1 may include the first object OB_1 and the fifth object OB_5, a (2_t)-th frame captured by a second camera C_2 may include the first object OB_1, a second object OB_2, and a third object OB_3, a (3_t)-th frame captured by a third camera C_3 may include the third object OB_3 and a fourth object OB_4, and a (4_t)-th frame captured by the fourth camera C_4 may include the fourth object OB_4 and the fifth object OB_5.

Accordingly, the first edge device corresponding to the first camera C_1 may perform the object detection on the (1_t)-th frame to detect the first object OB_1 as the (1_t_1)-th object and detect the fifth object OB_5 as a (1_t_2)-th object. Moreover, a second edge device corresponding to the second camera C_2 may perform the object detection on the (2_t)-th frame to detect the first object OB_1 as a (2_t_1)-th object, detect the second object OB_2 as a (2_t_2)-th object, and detect the third object OB_3 as a (2_t_3)-th object. Further, a third edge device corresponding to the third camera C_3 may perform the object detection on the (3_t)-th frame to detect the third object OB_3 as a (3_t_1)-th object and detect the fourth object OB_4 as a (3_t_2)-th object. Furthermore, the fourth edge device corresponding to the fourth camera C_4 may perform the object detection on the (4_t)-th frame to detect the fourth object OB_4 as a (4_t_1)-th object and detect the fifth object OB_5 as a (4_t_2)-th object. Herein, in performing the object detection on each frame, the first edge device to the fourth edge device may perform the object detection on each frame by using a deep learning-based object detection model.

Then, the first edge device may generate the (1_t_1)-th object descriptor corresponding to the (1_t_1)-th object and a (1_t_2)-th object descriptor corresponding to the (1_t_2)-th object, and transmit them to the object tracking device. Further, the second edge device may generate a (2_t_1)-th object descriptor corresponding to the (2_t_1)-th object, a (2_t_2)-th object descriptor corresponding to the (2_t_2)-th object, and a (2_t_3)-th object descriptor corresponding to the (2_t_3)-th object, and transmit them to the object tracking device. Furthermore, the third edge device may generate a (3_t_1)-th object descriptor corresponding to the (3_t_1)-th object and a (3_t_2)-th object descriptor corresponding to the (3_t_2)-th object, and transmit them to the object tracking device. Moreover, the fourth edge device may generate a (4_t_1)-th object descriptor corresponding to the (4_t_1)-th object and (4_t_2)-th object descriptor corresponding to the (4_t_2)-th object, and transmit them to the object tracking device.

Herein, each of the object descriptors may include the appearance feature information and the geometric feature information related to each of the detected objects. For reference, variables in the description and mathematical formulas below may be different from variables used to distinguish each of the cameras, each of the edge devices, each of the objects, and each of the descriptors in the previous description.

The appearance feature information of the object may be embedded features which are acquired by embedding at least one of (i) a cropped image or its feature information, wherein the cropped image is obtained by cropping a bounding box area of the detected object, (ii) clothing color information of the object identified by inputting the cropped image into an identification model, (iii) hairstyle information of the object, (iv) hair color information of the object, (v) skin color information of the object, and (vi) facial feature information of the object, and may be briefly expressed as $f^{app} \in R^{d^a}$.

In addition, the geometric feature information of the object may be various geometric information of the object located within the specific space, and may include (i) BEV coordination information, (ii) object displacement information, (iii) 3D epipolar similarity information, (iv) object key point information, (v) body shape information, which is the body proportion of the object, etc.

The BEV coordinate may be obtained by projecting a center coordinate u of a bounding box corresponding to the object onto the ground plane based on camera internal parameters K and camera external parameters, and may be expressed as $p^{bev} \sim H_{floor} u$, wherein the camera internal parameters K include a focal length, a principal point, an asymmetry coefficient, etc., and the camera external parameters indicate a three-dimensional rotation R and translation t between a world coordinate system and a camera coordinate system.

In addition, the object displacement may be obtained through an estimation by referring to the BEV coordinate information, and the estimation may be based on a cumulative average velocity or a plurality of recent frames to utilize short-term displacement patterns as well as mid-term to long-term movement patterns. The object displacement may be expressed as the following mathematical formula.

$$v = \frac{p_t^{bev} - p_{t-\Delta t}^{bev}}{\Delta t}$$

Additionally, the 3D epipolar similarity may be an epipolar similarity for the object between the multiple cameras where at least a portion of their viewing frustums overlap.

Figure 4:
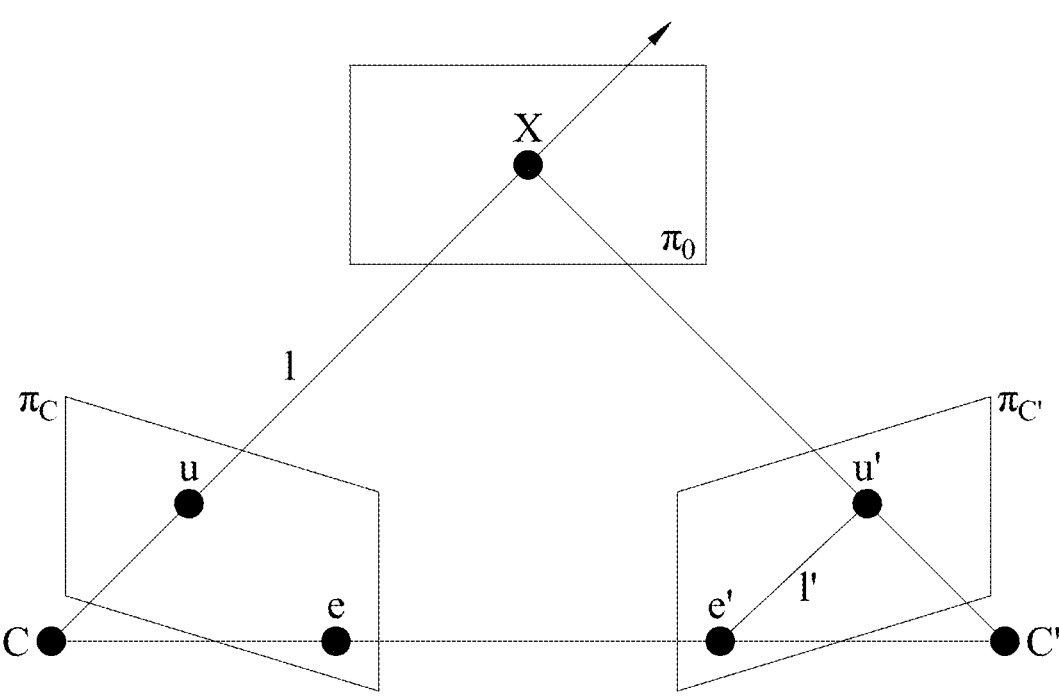
FIG. 4 is a drawing schematically illustrating an epipolar planar view for calculating 3D epipolar similarity information among geometric features for each of the multiple objects in the method for tracking the multiple objects by using the multiple cameras in accordance with one example embodiment of the present disclosure.

For example, by referring to FIG. 4, in a state of assuming that the same object is located in the specific space, a point X corresponding to the same object in the specific space may be projected to u in a frame from one camera and to u' in a frame from another camera.

Herein, in an epipolar plane formed by the origins of two cameras C, C' and the point X, an epipolar line I' may correspond to a straight line I connecting the origin C of the one camera and the point X, wherein the epipolar line I' is formed by an epipole e' and the projection point u' of the another camera. That is, they may be proportional with respect to the origin C' of the another camera.

Therefore, when the straight line I including the projection point u from the one camera is converted into the epipolar line I' in the another camera, the projection position I(u) where the projection point u from the one camera is projected onto the frame from the another camera may be identified. A difference between this I(u) and the position u' of the object projected onto the frame from the another camera may be used as the 3D epipolar similarity, and may be expressed as the following mathematical formula.

$$d_{epi}(u,u')=\text{dist}(u',I(u)),I(u)=Fu$$

In the above mathematical formula, I(u) represents the position where the projection point u from the one camera is projected onto the frame from the another camera. In the case of the same object, the position I(u) where the projection point u of the object from the one camera is projected onto the frame from the another camera may be same as the projection point u' of the object in the frame from the another camera.

In addition, the object key point may be obtained by estimating a pose of the object included in the cropped image through a pose estimation model, and may be featured by extracting a 2D key point or skeleton-based pose information corresponding to the object. The object key point may be expressed as $\text{vec}(k_i)$.

The descriptors for the objects i, generated by concatenating the appearance feature information and the geometric feature information of the object described as above, may be exemplarily expressed as follows. In the mathematical formula below, $\gamma$ may represent a weight for applying each piece of the feature information.

$$d_i = \left[ \gamma_a f_i^{app} \| \gamma_p p_i^{bev} \| \gamma_v v_i \| \gamma k_i vec(k_i) \right]$$

However, the present disclosure is not limited thereto, and the geometric feature information may include various geometric information. The geometric feature information included in the descriptors may be flexibly changed according to problems or conditions arising in relation to the object tracking, without requiring changes in a design of the object tracking device.

Next, by referring to FIG. 1 and FIG. 2 again, the object tracking device 1000 may calculate each of the similarities of each of the object descriptor pairs by referring to the (1_t_1)-th object descriptor to the (n_t_j)-th object descriptor at a step of S200. Herein, each of the object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor.

That is, the object tracking device 1000 may receive the (1_t_1)-th object descriptor to the (1_t_i)-th object descriptor transmitted from the first edge device 10_1 through the (n_t_1)-th object descriptor to the (n_t_j)-th object descriptor transmitted from the n-th edge device 10_n. Further, the object tracking device 1000 may synchronize the received (1_t_1)-th object descriptor to the (1_t_i)-th object descriptor through the (n_t_1)-th object descriptor to the (n_t_j)-th object descriptor to the present time t, and then each of the similarities for each of the object descriptor pairs in the (1_t_1)-th object descriptor to the (n_t_j)-th object descriptor may be calculated.

For example, the similarity of the object descriptor pair may be a value obtained by applying each of weights to each of the similarities of each of the appearance feature information and the geometric feature information included in the object descriptors and then adding them up, and may be expressed as the following mathematical formula. For reference, the i and the j in the following mathematical formula may represent the object descriptor pair, but the present disclosure is not limited thereto, and the similarity of whether the information of the object descriptors is similar may be calculated by using various calculation methods.

$$s_{i,j} = w_a \cdot \cos\left(f_i^{app}, f_j^{app}\right) +$$
$$w_p \cdot \exp\left(-\frac{\|p_i^{bev} - p_j^{bev}\|^2}{\sigma_p^2}\right) + w_v \cdot \exp\left(-\frac{\|v_i - v_j\|^2}{\sigma_v^2}\right) + \cdots$$

Next, the object tracking device 1000 may input the (1_t_1)-th node corresponding to the (1_t_1)-th object descriptor to the (n_t_j)-th node corresponding to the (n_t_j)-th object descriptor and each of the spatial edges corresponding to each of the similarities into the GNN 2000, to thereby instruct the GNN 2000 to merge the nodes corresponding to the same object among the (1_t_1)-th node to the (n_t_j)-th node by referring to the (1_t_1)-th node to the (n_t_j)-th node and the spatial edges, and thus generate the t-th spatial graph including the (t_1)-th node to the (t_k)-th node at a step of S300.

Herein, merging the nodes corresponding to the same object among the (1_t_1)-th node to the (n_t_j)-th node means merging only nodes corresponding to the same object. Thus, as a result of merging, the (t_1)-th node to the (t_k)-th node may include nodes that have been merged with the same object and nodes that have not been merged.

Also, merging the nodes may not mean that the nodes corresponding to the same object, i.e., the object descriptors, are combined into one, but rather it may mean that re-identification regarding the same object is performed, so that a same object ID is assigned to the nodes corresponding to the same object, while other nodes retain their existing object IDs.

That is, the object tracking device 1000 may input an input graph into GNN, to thereby instruct the GNN to merge the same nodes, and thus merge the same objects among the objects detected from each of the camera images, and finally, accurately detect the objects located within the specific space at the present time t, wherein the input graph has each of the (1_t_1)-th object descriptor to the (n_t_j)-th object descriptor as the nodes and each of the similarities as edges.

Figure 5:
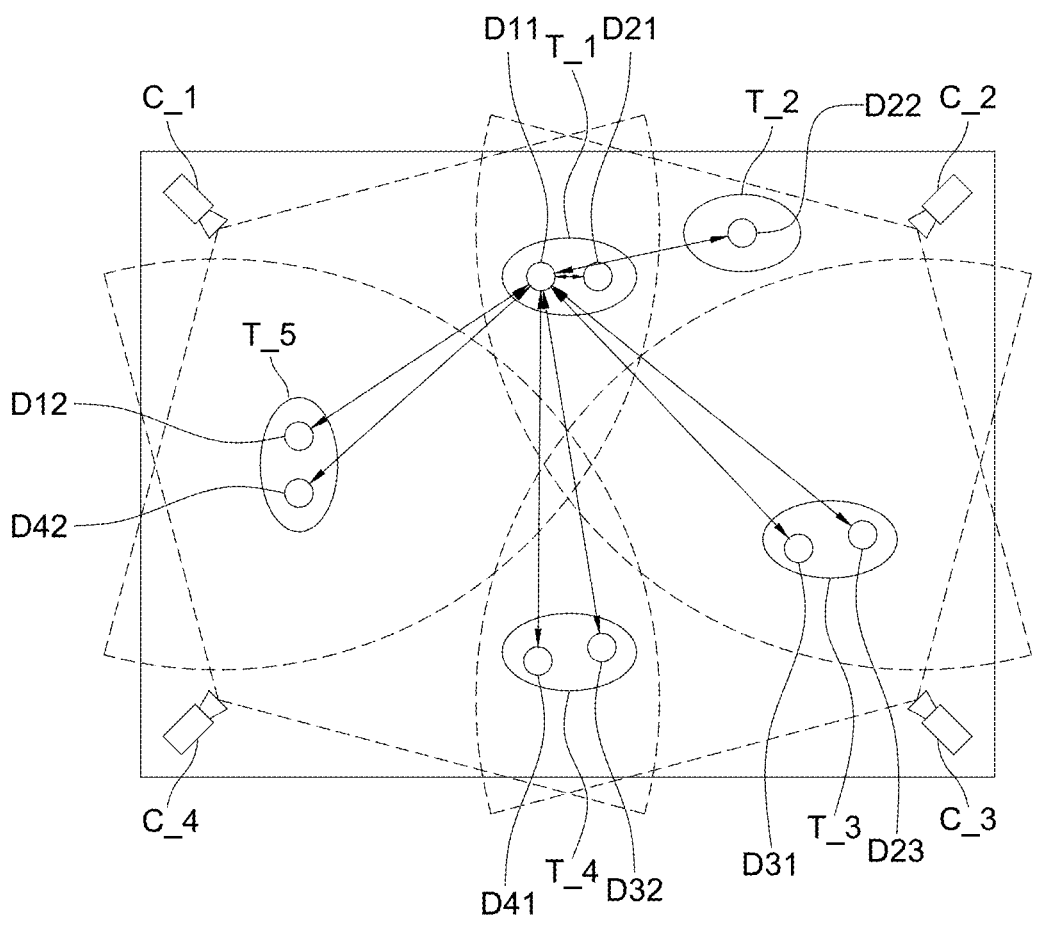
FIG. 5 is a drawing schematically illustrating a spatial graph for each of the multiple objects in the specific space in the method for tracking the multiple objects by using the multiple cameras in accordance with one example embodiment of the present disclosure.

For example, by referring to FIG. 5, in case of merging the transmitted object descriptors according to the example of FIG. 3 by referring to the similarities, the (1_t_1)-th object descriptor D11 transmitted from the first edge device corresponding to the first camera C_1 and the (2_t_1)-th object descriptor D21 transmitted from the second edge device corresponding to the second camera C_2 may be merged into the (t_1)-th node T_1. Further, the (2_t_3)-th object descriptor D23 transmitted from the second edge device corresponding to the second camera C_2 and the (3_t_1)-th object descriptor D31 transmitted from the third edge device corresponding to the third camera C_3 may be merged into a (t_3)-th node T_3. Furthermore, the (3_t_2)-th object descriptor D32 transmitted from the third edge device corresponding to the third camera C_3 and the (4_t_1)-th object descriptor D41 transmitted from the fourth edge device corresponding to the fourth camera C_4 may be merged into a (t_4)-th node T_4. Moreover, the (1_t_2)-th object descriptor D12 transmitted from the first edge device corresponding to the first camera C_1 and the (4_t_2)-th object descriptor D42 transmitted from the fourth edge device corresponding to the fourth camera C_4 may be merged into a (t_5)-th node T_5. In addition, the (2_t_2)-th object descriptor D22 transmitted from the second edge device corresponding to the second camera C_2 may not be merged because it is determined that the same object does not exist based on the similarity, and the (2_t_2)-th object descriptor D22 itself may become a (t_2)-th node T_2. Meanwhile, in the above, it was described that all nodes for the same object are merged, but if the similarity does not satisfy a criteria set for merging the nodes, the nodes for the same object may exist as different nodes, and these may be merged into the same object in the temporal graph described below.

Next, by referring to FIG. 1 and FIG. 2 again, the object tracking device 1000 may generate each piece of the correspondence information between each of the (t_1)-th node to the (t_k)-th node of the t-th spatial graph and each of a ((t−1)_1)-th node to a ((t−1)_p)-th node of a (t−1)-th spatial graph at a step of S400, wherein the (t−1)-th spatial graph is generated at the previous time (t−1).

Herein, the previous time (t−1) does not necessarily mean a time corresponding to a frame immediately before a frame corresponding to the present time t, but may also mean a time corresponding to a frame prior to set multiple frames. In addition, if an object detected within the specific space in the previous time (t−1) exists, the p is 1 or more, otherwise, the ((t−1)_1)-th node to the ((t−1)_p)-th node may not exist.

Furthermore, in generating specific correspondence information between a (t_specific)-th node and a ((t−1)_specific)-th node, wherein the (t_specific)-th node is one of the (t_1)-th node to the (t_k)-th node and the ((t−1)_specific)-th node is one of the ((t−1)_1)-th node to ((t−1)¬_p)-th node, the object tracking device 1000 may generate the specific correspondence information such that the specific correspondence information includes at least one of (i) time interval information between the present time t and the previous time (t−1), (ii) movement distance information between the (t_specific)-th node and the ((t−1)_specific)-th node within the specific space, and (iii) velocity difference information between the (t_specific)-th node and the ((t−1)_specific)-th node.

Next, the object tracking device 1000 may input the (t_1)-th node to the (t_k)-th node, the ((t−1)_1)-th node to the ((t−1)_p)-th node, and temporal edges corresponding to each piece of the correspondence information into the GNN 2000, to thereby instruct the GNN 2000 to merge the nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate the t-th temporal-spatial graph at a step of S500. Herein, the nodes among the (t_1)-th node to the (t_k)-th node that were not merged because their similarities did not satisfy the criteria during the merging process using the spatial edge may also be merged by using the temporal edges.

Through this, the object tracking device 1000 may track the objects by performing the re-identification for the objects located within the specific space, while using minimal computing resources, by receiving only the object descriptors for the objects detected in each of the images, unlike the conventional method of receiving each of the images captured by each of the cameras.

Figure 6:
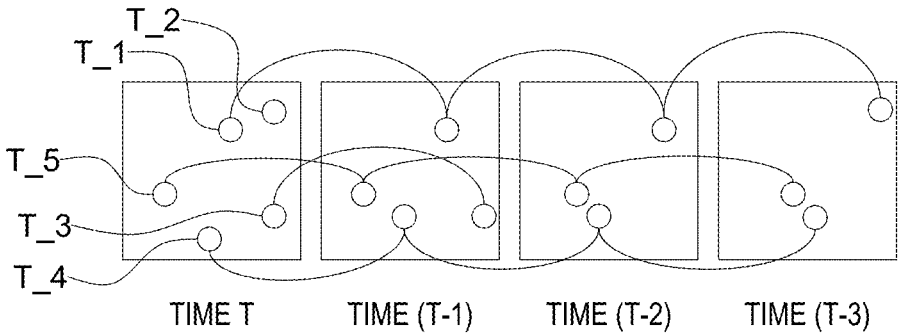
FIG. 6 is a drawing schematically illustrating a temporal-spatial graph for each of the multiple objects in the specific space in the method for tracking the multiple objects by using the multiple cameras in accordance with one example embodiment of the present disclosure.

For example, by referring to FIG. 6, in the merged t-th spatial graph at the present time t, the (t_1)-th node T_1, the (t_4)-th node T_4, and the (t_5)-th node T_5 have nodes that are merged, i.e., connected, from the previous times t−1 to t−3. Accordingly, it may be understood that the first object corresponding to the (t_1)-th node T_1, the fourth object corresponding to the (t_4)-th node T_4, and the fifth object corresponding to the (t_5)-th node T_5 have been continuously located within the specific space from the previous time t−3 to the present time t, and that their movement paths within the specific space may be tracked. Also, in the merged t-th spatial graph at the present time t, the (t_2)-th node T_2 has no nodes that are merged, i.e., connected, from the previous times t−1 to t−3. Accordingly, it may be understood that the second object corresponding to the (t_2)-th node T_2 has entered the specific space at the present time t. In addition, in the merged t-th spatial graph at the present time t, the (t_3)-th node T_3 has a connected node at the previous time t−1, but no connected nodes from the previous time t−2. Accordingly, it may be understood that the third object corresponding to the (t_3)-th node T_3 has entered the specific space at the previous time t−1 and is moving within the specific space.

Meanwhile, although the above description exemplified a case where the detected object is a moving object, the present disclosure is not limited thereto, and may be equally applied to the object that does not move. In such a case, it may be used to check whether the object has been stolen or to determine where items, equipment, or facilities located within the specific space have been moved.

In addition, it was described that the object tracking device 1000 (i) merges the nodes corresponding to the same object among the (1_t_1)-th node to the (n_t_j)-th node by referring to the spatial edge information, and thus generates the t-th spatial graph including the (t_1)-th node to the (t_k)-th node, and then (ii) merges the nodes corresponding to the same object between the (t_1)-th node to the (t_k)-th node and the ((t−1)_1)-th node to the ((t−1)_p)-th node by referring to the temporal edge information, and thus generates the t-th temporal-spatial graph. However, unlike this, the object tracking device 1000 may merge the nodes corresponding to the same object between the (1_t_1)-th node to the (n_t_j)-th node, and between the (1_t_1)-th node to the (n_t_j)-th node and the ((t−1)_1)-th node to the ((t−1)_p)-th node by referring to the spatial edge information and the temporal edge information, and thus generate the t-th temporal-spatial graph.

That is, the object tracking device 1000 may generate each of the similarities of each of the spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of the ((t−1)_1)-th node to the ((t−1)_p)-th node, wherein each of the ((t−1)_1)-th node to the ((t−1)_p)-th node is the node of the (t−1)-th temporal-spatial graph generated at the previous time (t−1). In addition, the object tracking device 1000 may input the (1_t_1)-th node corresponding to the (1_t_1)-th object descriptor to the (n_t_j)-th node corresponding to the (n_t_j)-th object descriptor, the ((t−1)_1)-th node to the ((t−1)_p)-th node, the spatial edges corresponding to the similarities, and the temporal edges corresponding to the correspondence information into the GNN 2000, to thereby instruct the GNN 2000 to (i) perform one of sub-processes of: (i−1) merging the nodes corresponding to the same object among the (1_t_1)-th node to the (n_t_j)-th node by referring to the spatial edges, and thus generating the (t_1)-th node to the (t_k)-th node, merging the nodes corresponding to the same object among the (t_1)-th node to the (t_k)-th node and the ((t−1)_1)-th node to the ((t−1) p)-th node by referring to the temporal edges, and thus generating the t-th temporal-spatial graph; and (i−2) merging the nodes corresponding to the same object among the (1_t_1)-th node to the (n_t_j)-th node and the ((t−1)_1)-th node to the ((t−1) _p)-th node by referring to the temporal edges, identifying the merged nodes and the unmerged nodes among the (1_t_1)-th node to the (n_t_j)-th node, merging the nodes corresponding to the same object among the merged nodes and the unmerged nodes, and thus generating the t-th temporal-spatial graph; and finally, (ii) track the multiple objects within the specific space.

The present disclosure has an effect of enabling an accurate object tracking regardless of a capturing environment of the camera.

The present disclosure has another effect of enabling a more accurate object re-identification by utilizing the geometric features for each of the multiple objects.

The present disclosure has still another effect of providing the object tracking device applicable to various real-world situations without requiring separate design modifications.

The present disclosure has still another effect of enabling the object tracking by using the minimal computing resources.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for tracking multiple objects by using multiple cameras based on a temporal-spatial GNN utilizing geometric features for each of the multiple objects, comprising steps of:

(a) acquiring, by an object tracking device, each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist;

(b) calculating, by the object tracking device, similarities of each of object descriptor pairs by referring to the (1_t_1)-th object descriptor to the (n_t_j)-th object descriptor, wherein each of the object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and inputting, by the object tracking device, a (1_t_1)-th node corresponding to the (1_t_1)-th object descriptor to an (n_t_j)-th node corresponding to the (n_t_j)-th object descriptor and each of spatial edges corresponding to each of the similarities into the GNN (Graph Neural Network), to thereby instruct the GNN to (i) merge nodes corresponding to a same object among the (1_t_1)-th node to the (n_t_j)-th node by referring to the (1_t_1)-th node to the (n_t_j)-th node and the spatial edges, and thus (ii) generate a t-th spatial graph including a (t_1)-th node to a (t_k)-th node, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist; and (c) generating, by the object tracking device, each piece of correspondence information between each of the (t_1)-th node to the (t_k)-th node of the t-th spatial graph and each of a ((t−1)_1)-th node to a ((t−1)_p)-th node of a (t−1)-th spatial graph, wherein the (t−1)-th spatial graph is generated at a previous time (t−1), and wherein if an object detected within the specific space in the previous time (t−1) exists, the p is 1 or more, otherwise, the ((t−1)_1)-th node to the ((t−1)_p)-th node do not exist, and inputting, by the object tracking device, the (t_1)-th node to the (t_k)-th node, the ((t−1)_1)-th node to the ((t−1)_p)-th node, and temporal edges corresponding to each piece of the correspondence information into the GNN, to thereby instruct the GNN to (i) merge nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate a t-th temporal-spatial graph, and finally, (ii) track the multiple objects within the specific space.

2. The method of claim 1, wherein, at the step of (a), a specific object descriptor, which is one of the (1_t_1)-th object descriptor to the (n_t_j)-th object descriptor, includes specific appearance feature information and specific geometric feature information, wherein the specific appearance feature information has embedded features which are acquired by embedding at least one of (i) a cropped image or its feature information, wherein the cropped image is obtained by cropping a specific object area corresponding to a specific object from a specific frame, wherein the specific frame is captured by a specific camera corresponding to the specific object descriptor, wherein the specific camera is one of the first camera to the n-th camera, (ii) clothing color information of the specific object, (iii) hairstyle information of the specific object, (iv) hair color information of the specific object, (v) skin color information of the specific object, and (vi) facial feature information of the specific object, wherein the specific geometric feature information has at least one of (i) BEV (Bird's Eye View) coordinate information obtained by projecting a center coordinate of a bounding box corresponding to the specific object onto a ground plane based on camera parameters of the specific camera, (ii) object displacement information, which is a displacement of the specific object estimated by referring to the BEV coordinate, (iii) 3D epipolar similarity information for the specific object calculated based on the specific camera and at least one other camera, wherein the at least one other camera has another viewing frustum that at least partially overlaps with a specific viewing frustum of the specific camera, (iv) object key point information according to a pose of the specific object, and (v) body shape information of the specific object.

3. The method of claim 2, wherein the specific appearance feature information further includes reliability information indicating a reliability of the embedded features due to an occlusion of the specific object between the specific frame and other frames.

4. The method of claim 1, wherein, at the step of (c), in generating specific correspondence information between a (t_specific)-th node and a ((t−1)_specific)-th node, wherein the (t_specific)-th node is one of the (t_1)-th node to the (t_k)-th node and the ((t−1)_specific)-th node is one of the ((t−1)_1)-th node to ((t−1)_p)-th node, the object tracking device generates the specific correspondence information such that the specific correspondence information includes at least one of (i) time interval information between the present time t and the previous time (t−1), (ii) movement distance information between the (t_specific)-th node and the ((t−1)_specific)-th node within the specific space, and (iii) velocity difference information between the (t_specific)-th node and the ((t−1)_specific)-th node.

5. The method of claim 1, wherein, at the step of (a), the object tracking device receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

6. The method of claim 5, wherein, at the step of (a), a specific edge device, which is one of the first edge device to the n-th edge device, performs an object detection on a specific frame, which is captured by a specific camera corresponding to the specific edge device, to thereby detect specific objects on the specific frame, wherein the specific camera is one of the first camera to the n-th camera, generates each piece of specific appearance feature information of each of the specific objects by referring to each of detection results of each of the specific objects, generates each piece of specific geometric feature information for each of the specific objects based on at least the specific camera, and generates each of specific object descriptors for each of the specific objects by referring to each piece of the specific appearance feature information and each piece of the specific geometric feature information.

7. The method of claim 1, wherein, at the step of (a), the object tracking device receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

8. A method for tracking multiple objects by using multiple cameras based on a temporal-spatial GNN utilizing geometric features for each of the multiple objects, comprising steps of:

(a) acquiring, by an object tracking device, each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; and (b) generating, by the object tracking device, similarities of each of spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of a ((t−1)_1)-th node to a ((t−1)_p)-th node, wherein each of the ((t−1)_1)-th node to the ((t−1)_p)-th node is a node of a (t−1)-th temporal-spatial graph generated at a previous time (t−1), wherein each of the spatial object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and wherein if an object detected within the specific space in the previous times exists, the p is 1 or more, otherwise, the ((t−1)_1)-th node to the ((t−1)_p)-th node do not exist, and inputting, by the object tracking device, a (1_t_1)-th node corresponding to the (1_t_1)-th object descriptor to an (n_t_j)-th node corresponding to the (n_t_j)-th object descriptor, the ((t−1)_1)-th node to the ((t−1)_p)-th node, spatial edges corresponding to the similarities, and temporal edges corresponding to the correspondence information into the GNN (Graph Neural Network), to thereby instruct the GNN to (i) perform one of sub-processes of: (i−1) merging nodes corresponding to a same object among the (1_t_1)-th node to the (n_t_j)-th node by referring to the spatial edges, and thus generating a (t_1)-th node to a (t_k)-th node, merging nodes corresponding to the same object among the (t_1)-th node to the (t_k)-th node and the ((t−1)_1)-th node to the ((t−1)_p)-th node by referring to the temporal edges, and thus generating a t-th temporal-spatial graph; and (i−2) merging nodes corresponding to the same object among the (1_t_1)-th node to the (n_t_j)-th node and the ((t−1)_1)-th node to the ((t−1)_p)-th node by referring to the temporal edges, identifying merged nodes and unmerged nodes among the (1_t_1)-th node to the (n_t_j)-th node, merging nodes corresponding to the same object among the merged nodes and the unmerged nodes, and thus generating the t-th temporal-spatial graph; and finally, (ii) track the multiple objects within the specific space, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist.

9. The method of claim 8, wherein, at the step of (a), the object tracking device receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

10. The method of claim 8, wherein, at the step of (a), the object tracking device receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the step of (b), the object tracking device synchronizes, to the present time t, the (1_t_1)-th object descriptor to the (1_t_i)-th object descriptor through the (n_t_1)-th object descriptor to the (n_t_j)-th object descriptor.

11. An object tracking device for tracking multiple objects by using multiple cameras based on a temporal-spatial GNN utilizing geometric features for each of the multiple objects, comprising:

at least one memory which saves instructions for tracking the multiple objects by using the multiple cameras based on the temporal-spatial GNN utilizing the geometric features for each of the multiple objects; and at least one processor configured to perform an operation for tracking the multiple objects by using the multiple cameras based on the temporal-spatial GNN utilizing the geometric features for each of the multiple objects according to the instructions stored in the memory to perform processes of: (I) acquiring each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; (II) calculating similarities of each of object descriptor pairs by referring to the (1_t_1)-th object descriptor to the (n_t_j)-th object descriptor, wherein each of the object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and inputting a (1_t_1)-th node corresponding to the (1_t_1)-th object descriptor to an (n_t_j)-th node corresponding to the (n_t_j)-th object descriptor and each of spatial edges corresponding to each of the similarities into the GNN (Graph Neural Network), to thereby instruct the GNN to (i) merge nodes corresponding to a same object among the (1_t_1)-th node to the (n_t_j)-th node by referring to the (1_t_1)-th node to the (n_t_j)-th node and the spatial edges, and thus (ii) generate a t-th spatial graph including a (t_1)-th node to a (t_k)-th node, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist; and (III) generating each piece of correspondence information between each of the (t_1)-th node to the (t_k)-th node of the t-th spatial graph and each of a ((t−1)_1)-th node to a ((t−1)_p)-th node of a (t−1)-th spatial graph, wherein the (t−1)-th spatial graph is generated at a previous time (t−1), and wherein if an object detected within the specific space in the previous time (t−1) exists, the p is 1 or more, otherwise, the ((t−1)_1)-th node to the ((t−1)_p)-th node do not exist, and inputting the (t_1)-th node to the (t_k)-th node, the ((t−1)_1)-th node to the ((t−1)_p)-th node, and temporal edges corresponding to each piece of the correspondence information into the GNN, to thereby instruct the GNN to (i) merge nodes corresponding to the same object between the (t_1)-th node to the (t_k)-th node and the ((t−1)_1)-th node to the ((t−1)_p)-th node by referring to the (t_1)-th node to the (t_k)-th node, the ((t−1)_1)-th node to the ((t−1)_p)-th node and the temporal edges, and thus generate a t-th temporal-spatial graph, and finally, (ii) track the multiple objects within the specific space.

12. The object tracking device of claim 11, wherein a specific object descriptor, which is one of the (1_t_1)-th object descriptor to the (n_t_j)-th object descriptor, includes specific appearance feature information and specific geometric feature information, wherein the specific appearance feature information has embedded features which are acquired by embedding at least one of (i) a cropped image or its feature information, wherein the cropped image is obtained by cropping a specific object area corresponding to a specific object from a specific frame, wherein the specific frame is captured by a specific camera corresponding to the specific object descriptor, wherein the specific camera is one of the first camera to the n-th camera, (ii) clothing color information of the specific object, (iii) hairstyle information of the specific object, (iv) hair color information of the specific object, (v) skin color information of the specific object, and (vi) facial feature information of the specific object, wherein the specific geometric feature information has at least one of (i) BEV (Bird's Eye View) coordinate information obtained by projecting a center coordinate of a bounding box corresponding to the specific object onto a ground plane based on camera parameters of the specific camera, (ii) object displacement information, which is a displacement of the specific object estimated by referring to the BEV coordinate, (iii) 3D epipolar similarity information for the specific object calculated based on the specific camera and at least one other camera, wherein the at least one other camera has another viewing frustum that at least partially overlaps with a specific viewing frustum of the specific camera, (iv) object key point information according to a pose of the specific object, and (v) body shape information of the specific object.

13. The object tracking device of claim 12, wherein the specific appearance feature information further includes reliability information indicating a reliability of the embedded features due to an occlusion of the specific object between the specific frame and other frames.

14. The object tracking device of claim 11, wherein, at the process of (III), in generating specific correspondence information between a (t_specific)-th node and a ((t−1)_specific)-th node, wherein the (t_specific)-th node is one of the (t_1)-th node to the (t_k)-th node and the ((t−1)_specific)-th node is one of the ((t−1)_1)-th node to ((t−1)_p)-th node, the processor generates the specific correspondence information such that the specific correspondence information includes at least one of (i) time interval information between the present time t and the previous time (t−1), (ii) movement distance information between the (t_specific)-th node and the ((t−1)_specific)-th node within the specific space, and (iii) velocity difference information between the (t_specific)-th node and the ((t−1)_specific)-th node.

15. The object tracking device of claim 11, wherein, at the process of (I), the processor receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

16. The object tracking device of claim 15, wherein, at the process of (I), a specific edge device, which is one of the first edge device to the n-th edge device, performs an object detection on a specific frame, which is captured by a specific camera corresponding to the specific edge device, to thereby detect specific objects on the specific frame, wherein the specific camera is one of the first camera to the n-th camera, generates each piece of specific appearance feature information of each of the specific objects by referring to each of detection results of each of the specific objects, generates each piece of specific geometric feature information for each of the specific objects based on at least the specific camera, and generates each of specific object descriptors for each of the specific objects by referring to each piece of the specific appearance feature information and each piece of the specific geometric feature information.

17. The object tracking device of claim 11, wherein, at the process of (I), the processor receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

18. An object tracking device for tracking multiple objects by using multiple cameras based on a temporal-spatial GNN utilizing geometric features for each of the multiple objects, comprising:

at least one memory which saves instructions for tracking the multiple objects by using the multiple cameras based on the temporal-spatial GNN utilizing the geometric features for each of the multiple objects; and at least one processor configured to perform an operation for tracking the multiple objects by using the multiple cameras based on the temporal-spatial GNN utilizing the geometric features for each of the multiple objects according to the instructions stored in the memory to perform processes of: (I) acquiring each of a (1_t_1)-th object descriptor to a (1_t_i)-th object descriptor corresponding to each of a (1_t_1)-th object to a (1_t_i)-th object on a (1_t)-th frame through each of an (n_t_1)-th object descriptor to an (n_t_j)-th object descriptor corresponding to each of an (n_t_1)-th object to an (n_t_j)-th object on an (n_t)-th frame, wherein each of the (1_t)-th frame to the (n_t)-th frame is captured at a present time t from each of a first camera to an n-th camera installed in a specific space, wherein the n is 2 or more, and the first camera to the n-th camera have different viewing frustums, wherein if an object exists on the (1_t)-th frame, the i is 1 or more, and each of the (1_t_1)-th object descriptor to the (1_t_i)-th object descriptor includes respective appearance feature information and respective geometric feature information for each of the (1_t_1)-th object to the (1_t_i)-th object, and if the object does not exist on the (1_t)-th frame, the (1_t_1)-th object descriptor to the (1_t_i)-th object descriptor do not exist, wherein if an object exists on the (n_t)-th frame, the j is 1 or more, and each of the (n_t_1)-th object descriptor to the (n_t_j)-th object descriptor includes respective appearance feature information and respective geometric feature information for each of the (n_t_1)-th object to the (n_t_j)-th object, and if the object does not exist on the (n_t)-th frame, the (n_t_1)-th object descriptor to the (n_t_j)-th object descriptor do not exist; and (II) generating similarities of each of spatial object descriptor pairs by referring to the (1_t_1)-th object descriptor to the (n_t_j)-th object descriptor, and each piece of correspondence information between each of the (1_t_1)-th object descriptor to the (n_t_j)-th object descriptor and each of a ((t−1)_1)-th node to a ((t−1)_p)-th node, wherein each of the ((t−1)_1)-th node to the ((t−1)_p)-th node is a node of a (t−1)-th temporal-spatial graph generated at a previous time (t−1), wherein each of the spatial object descriptor pairs is each of pairs having one object descriptor among the (1_t_1)-th object descriptor to the (n_t_j)-th object descriptor and another object descriptor among the (1_t_1)-th object descriptor to the (n_t_j)-th object descriptor, and wherein if an object detected within the specific space in the previous times exists, the p is 1 or more, otherwise, the ((t−1)_1)-th node to the ((t−1)_p)-th node do not exist, and inputting a (1_t_1)-th node corresponding to the (1_t_1)-th object descriptor to an (n_t_j)-th node corresponding to the (n_t_j)-th object descriptor, the ((t−1)_1)-th node to the ((t−1)_p)-th node, spatial edges corresponding to the similarities, and temporal edges corresponding to the correspondence information into the GNN (Graph Neural Network), to thereby instruct the GNN to (i) perform one of sub-processes of: (i−1) merging nodes corresponding to a same object among the (1_t_1)-th node to the (n_t_j)-th node by referring to the spatial edges, and thus generating a (t_1)-th node to a (t_k)-th node, merging nodes corresponding to the same object among the (t_1)-th node to the (t_k)-th node and the ((t−1)_1)-th node to the ((t−1)_p)-th node by referring to the temporal edges, and thus generating a t-th temporal-spatial graph; and (i−2) merging nodes corresponding to the same object among the (1_t_1)-th node to the (n_t_j)-th node and the ((t−1)_1)-th node to the ((t−1)_p)-th node by referring to the temporal edges, identifying merged nodes and unmerged nodes among the (1_t_1)-th node to the (n_t_j)-th node, merging nodes corresponding to the same object among the merged nodes and the unmerged nodes, and thus generating the t-th temporal-spatial graph; and finally, (ii) track the multiple objects within the specific space, wherein if the (1_t_1)-th node to the (n_t_j)-th node exist, the k is 1 or more, and if the (1_t_1)-th node to the (n_t_j)-th node do not exist, the (t_1)-th node to the (t_k)-th node do not exist.

19. The object tracking device of claim 18, wherein, at the process of (I), the processor receives each of the (1_t_1)-th object descriptor to the (1_t_i)-th object descriptor through the (n_t_1)-th object descriptor to the (n_t_j)-th object descriptor from each of a first edge device corresponding to the first camera to an n-th edge device corresponding to the n-th camera, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

20. The object tracking device of claim 18, wherein, at the process of (I), the processor receives each of the (1_t_1)-th object descriptor to the (1_t_i)-th object descriptor through the (n_t_1)-th object descriptor to the (n_t_j)-th object descriptor from each of a first edge device to an n'-th edge device, wherein the first edge device to the n'-th edge device correspond to first grouped cameras to n'-th grouped cameras, wherein the first grouped cameras to the n'-th grouped cameras are acquired by clustering the first camera to the n-th camera into one or more groups, wherein, at the process of (II), the processor synchronizes, to the present time t, the (1_t_1)-th object descriptor to the (1_t_i)-th object descriptor through the (n_t_1)-th object descriptor to the (n_t_j)-th object descriptor.

* * * * *